(12) United States Patent
Takahashi et al.

(10) Patent No.: US 7,113,326 B2
(45) Date of Patent: Sep. 26, 2006

(54) OPTICAL FIBER WAVELENGTH CONVERTER

(75) Inventors: Masanori Takahashi, Chiyoda-ku (JP); Jiro Hiroishi, Chiyoda-ku (JP); Hideaki Tobioka, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 26 days.

(21) Appl. No.: 11/090,077

(22) Filed: Mar. 28, 2005

(65) Prior Publication Data

US 2005/0264871 A1  Dec. 1, 2005

(30) Foreign Application Priority Data

Apr. 14, 2004  (JP) ............................ 2004-118518

(51) Int. Cl.
*G02F 1/365*  (2006.01)
*G02B 6/02*  (2006.01)

(52) U.S. Cl. ................ 359/332; 359/326; 358/122

(58) Field of Classification Search ........ 359/326–332; 385/122
See application file for complete search history.

(56) References Cited

U.S. PATENT DOCUMENTS 6,459,525 B1  10/2002  Aso et al. .................. 359/332
6,501,591 B1 *  12/2002  Kumar et al. ............... 359/330
6,661,958 B1 *  12/2003  Hirano et al. ............... 385/127
6,766,087 B1  7/2004  Hiroishi et al. ............. 385/122
6,982,823 B1 *  1/2006  Okuno ....................... 359/332

FOREIGN PATENT DOCUMENTS

JP  2001-75136  3/2001

* cited by examiner

*Primary Examiner*—John D. Lee
(74) *Attorney, Agent, or Firm*—Oblon, Spivak, McClelland, Maier & Neustadt, P.C.

(57) ABSTRACT

An optical fiber wavelength converter inputs signal light and pumping light into an end of the highly nonlinear optical fiber to obtain converted light of the signal light from the other end of the highly nonlinear optical fiber. In the optical fiber wavelength converter, a wavelength $\lambda p$ of the pumping light is set within a range from $\lambda_0-1$ nanometers to $\lambda_0+1$ nanometers, where $\lambda_0$ is a zero-dispersion wavelength of the highly nonlinear optical fiber, an absolute value of a dispersion slope of the highly nonlinear optical fiber with the wavelength $\lambda p$ is not more than 0.02 ps/nm²/km, a nonlinear coefficient $\gamma$ of the highly nonlinear optical fiber with the wavelength $\lambda p$ is not less than 10/W/km, and a change in a conversion bandwidth D defined as $D=|\lambda p-\lambda s_2|$ is not more than 30 percent at variable environmental temperatures ranging from 0° C to 40° C.

16 Claims, 2 Drawing Sheets

OPTICAL FIBER WAVELENGTH CONVERTER

BACKGROUND OF THE INVENTION

1. Field of the Invention

The present invention relates to an optical fiber wavelength converter which uses a highly nonlinear optical fiber.

2. Description of the Related Art

In recent years, the communication is required to have fast processing, large capacity, and long transmission distance, therefore light signal processing technologies to enable fast processing of light signals and a long transmission distance are desired.

One approach of light signal processing is the all-optical signal processing technology in which light signals are processed as it is. Since this all-optical signal processing technology handles light signals as it is without a conversion of light signals to electric signals, a fast light signal processing is enabled.

As the all-optical signal processing technologies, for example, a method which uses nonlinear optical phenomena that occur in an optical fiber where light signals transmit, and a method which uses nonlinear phenomena that occur in an optical waveguide made of highly nonlinear substance, are known.

The former all-optical signal processing technology which uses nonlinear optical phenomena that occur in an optical fiber especially receives attentions in recent years, since it allows a fast processing as well as a low transmission loss. The nonlinear optical phenomena that occur in the optical fiber include, for example, four-wave mixing, self-phase modulation, cross-phase modulation, and Brillouin Scattering. As the light signal processing technologies, wavelength conversion using the four-wave mixing, pulse compression or Reshaping using the self-phase modulation, and the like have been proposed.

Incidentally, four-wave mixing is a phenomenon that light of different wavelength appear by nonlinear phenomena according to a specific law when light of two or more wavelengths are introduced into an optical fiber. In the all-optical signal processing technologies, this phenomenon, which allows a generation of the light of different wavelength, is used for a wavelength conversion. Moreover, the wavelength conversion using four-wave mixing has advantages of converting a multi-wavelength signal in one batch processing at a high speed and in low noise. Therefore, such technologies are important for constructing a future fast signal processing system.

Incidentally, to apply a light signal processing technology, such as wavelength conversion, an optical fiber which performs highly nonlinear phenomena, i.e. an optical fiber which has high nonlinearity is necessary (hereinafter simply referred to as "highly nonlinear optical fiber.")

This highly nonlinear optical fiber and an optical fiber wavelength converter using the highly nonlinear optical fiber is disclosed in Japanese patent Application Laid-open No. 2001-75136.

According to the optical fiber wavelength converter disclosed in Japanese patent Application Laid-open No. 2001-75136 as well as the other optical fiber wavelength converters using such a highly nonlinear optical fiber, it is found that changes in temperature around the optical fiber wavelength converter (hereinafter, simply referred to as "environmental temperature") change the characteristics, in particular bandwidth of the wavelength conversion. More specifically, several highly nonlinear optical fibers are manufactured, when the optical fiber wavelength converters using those fibers are operated under different environmental temperatures, the bandwidth of the wavelength conversion is changed according to the environmental temperature.

SUMMARY OF THE INVENTION

To solve the above problems, an object of the present invention is to provide an optical fiber wavelength converter which enables a wavelength conversion that is stable and has a small change in the wavelength conversion bandwidth against the changes in the environmental temperature of the environment of the converter.

An optical fiber wavelength converter according to one aspect of the present invention, wherein a wavelength $\lambda p$ of the pumping light is set within a range from $\lambda_0-1$ nanometers to $\lambda_0+1$ nanometers, where $\lambda_0$ is a zero-dispersion wavelength of the highly nonlinear optical fiber, an absolute value of a dispersion slope of the highly nonlinear optical fiber with the wavelength $\lambda p$ of the pumping light is not more than 0.02 ps/nm²/km, a nonlinear coefficient $\gamma$ of the highly nonlinear optical fiber with the wavelength $\lambda p$ of the pumping light is not less than 10/W/km, and a change in a conversion bandwidth D defined as $D=|\lambda p-\lambda s_2|$ is not more than 30 percent at variable environmental temperatures ranging from 0° C. to 40° C., where $E_0$ is defined to be a conversion efficiency, when the wavelength $\lambda p$ of the pumping light is set to any wavelength within the range from $\lambda_0-1$ nanometers to $\lambda_0+1$ nanometers and a wavelength $\lambda s$ of the signal light is set to $\lambda p-5$ nanometers, $\lambda s_2$ is a wavelength of the signal light in which the conversion efficiency becomes lower than $E_0$ by 3 dB when only the wavelength $\lambda s$ of the signal light is changed at the fixed wavelength $\lambda p$ of the pumping light.

An optical fiber wavelength converter according to another aspect of the present invention, wherein a wavelength $\lambda p$ of the pumping light is set within a range from $\lambda_0-1$ nanometers to $\lambda_0+1$ nanometers, where $\lambda_0$ is a zero-dispersion wavelength of the highly nonlinear optical fiber, an absolute value of a dispersion slope of the highly nonlinear optical fiber with the wavelength $\lambda p$ of the pumping light is not more than 0.02 ps/nm²/km, a nonlinear coefficient $\gamma$ of the highly nonlinear optical fiber with the wavelength $\lambda p$ of the pumping light is not less than 10/W/km, and changes in a conversion efficiency is only not more than 1 dB at not more than 25 nanometers of a wavelength difference $\Delta\lambda$ between the wavelength $\lambda p$ of the pumping light and a wavelength $\lambda s$ of the signal light at variable environmental temperatures ranging from 0° C. to 40° C.

An optical fiber wavelength converter according to still another aspect of the present invention, wherein a wavelength $\lambda p$ of the pumping light set within a range from $\lambda_0-1$ nanometers to $\lambda_0+1$ nanometers so that a conversion bandwidth D defined as $D=|\lambda p-\lambda s_2|$ becomes maximum within a environmental temperature range from 10° C. to 30° C., where $\lambda_0$ is a zero-dispersion wavelength of the highly nonlinear optical fiber, where $E_0$ is defined to be a conversion efficiency, when the wavelength $\lambda p$ of the pumping light is set to any wavelength within the range from $\lambda_0-1$ nanometers to $\lambda_0+1$ nanometers and a wavelength $\lambda s$ of the signal light is set to $\lambda p-5$ nanometers, $\lambda s_2$ is a wavelength of the signal light in which the conversion efficiency becomes lower than $E_0$ by 3 dB when only the wavelength $\lambda s$ of the signal light is changed at the fixed wavelength $\lambda p$ of the pumping light, an absolute value of a dispersion slope of the highly nonlinear optical fiber with the wavelength $\lambda p$ of the pumping light is not more than 0.02 ps/nm²/km, and a nonlinear coefficient γ of the highly nonlinear optical fiber with the wavelength λp of the pumping light is not less than 10/W/km.

An optical fiber wavelength converter according to still another aspect of the present invention, wherein a wavelength λp of the pumping light set within a range from $\lambda_0-1$ nanometers to $\lambda_0+1$ nanometers so that a conversion bandwidth D defined as D=|λp–λs$_2$| becomes maximum within a environmental temperature range from −20° C. to 60° C., where $\lambda_0$ is a zero-dispersion wavelength of the highly nonlinear optical fiber, where $E_0$ is defined to be a conversion efficiency, when the wavelength λp of the pumping light is set to any wavelength within the range from $\lambda_0-1$ nanometers to $\lambda_0+1$ nanometers and a wavelength λs of the signal light is set to λp−5 nanometers, λs$_2$ is a wavelength of the signal light in which the conversion efficiency becomes lower than $E_0$ by 3 dB when only the wavelength λs of the signal light is changed at the fixed wavelength λp of the pumping light, an absolute value of a dispersion slope of the highly nonlinear optical fiber with the wavelength λp of the pumping light is not more than 0.02 ps/nm$^2$/km, a nonlinear coefficient γ of the highly nonlinear optical fiber with the wavelength λp of the pumping light is not less than 10/W/km, and the optical fiber wavelength converter comprising a temperature-controlling mechanism which keeps a temperature of the highly nonlinear optical fiber within a range from T+5° C. to T−5° C., where T is a temperature in which the conversion bandwidth D becomes its maximum.

An optical fiber wavelength converter according to still another aspect of the present invention, wherein a wavelength λp of the pumping light set within a range from $\lambda_0-1$ nanometers to $\lambda_0+1$ nanometers so that a conversion bandwidth D defined as D=|λp–λs$_2$| becomes maximum within a environmental temperature range from −20° C. to 60° C., where $\lambda_0$ is a zero-dispersion wavelength of the highly nonlinear optical fiber, where $E_0$ is defined to be a conversion efficiency, when the wavelength λp of the pumping light is set to any wavelength within the range from $\lambda_0-1$ nanometers to $\lambda_0+1$ nanometers and a wavelength λs of the signal light is set to λp−5 nanometers, λs$_2$ is a wavelength of the signal light in which the conversion efficiency becomes lower than $E_0$ by 3 dB when only the wavelength λs of the signal light is changed at the fixed wavelength λp of the pumping light, an absolute value of a dispersion slope of the highly nonlinear optical fiber with the wavelength λp of the pumping light is not more than 0.02 ps/nm$^2$/km, a nonlinear coefficient γ of the highly nonlinear optical fiber with the wavelength λp of the pumping light is not less than 10/W/km, and the optical fiber wavelength converter comprising a temperature-controlling mechanism which keeps a temperature of the highly nonlinear optical fiber within a range from T+5° C. to T−5° C., where T is a temperature in which the conversion bandwidth D becomes its maximum.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
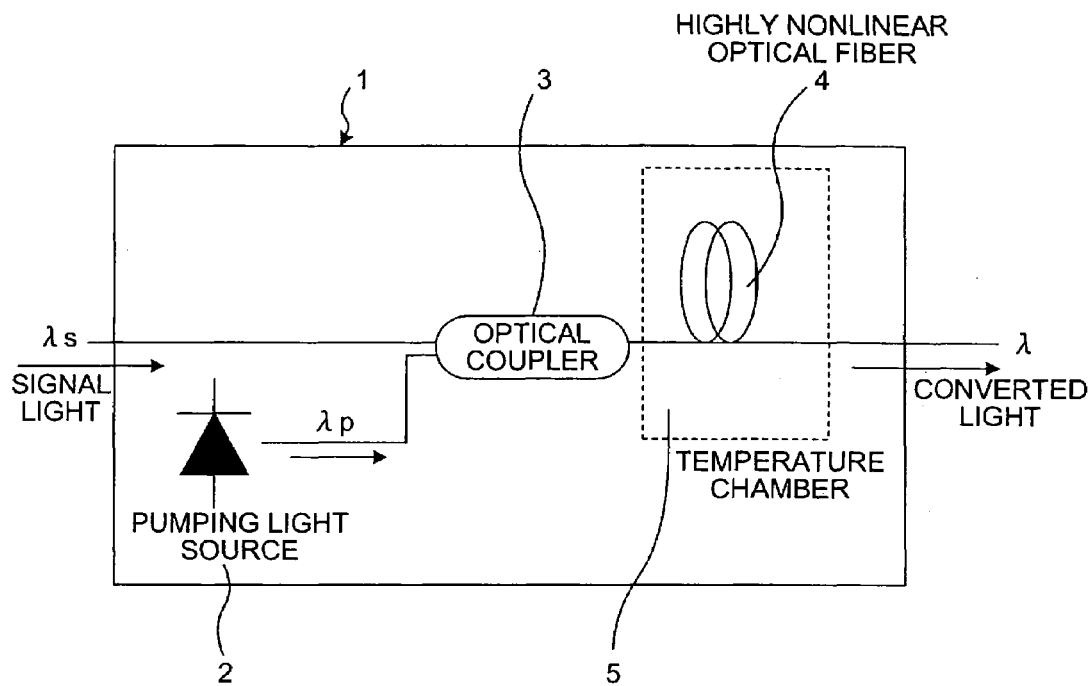
FIG. 1 is a schematic diagram of an embodiment of an optical fiber wavelength converter according to the present invention.

Exemplary embodiments of an optical fiber wavelength converter according to the present invention will be explained in detail below with reference to the accompanying drawings of FIG. 1 to FIG. 4. An embodiment of an optical fiber wavelength converter according to the present invention is shown in FIG. 1. As shown in FIG. 1, the optical fiber wavelength converter 1 has a pumping light source 2 which emits pumping light at the wavelength λp, an optical coupler 3 which couples signal light of the wavelength λs input to the optical fiber wavelength converter 1 and the pumping light of the wavelength λp, and a highly nonlinear optical fiber 4 which is connected to the rear end of the optical coupler 3 and coiled in a manner forming a ring-like shape. In addition, the reference character 5 indicating a block represented by broken lines is, for example, a temperature chamber containing the highly nonlinear optical fiber 4 if necessary and is used to more stabilize the temperature characteristics of the highly nonlinear optical fiber 4. The highly nonlinear optical fiber 4 is always ensured to be stabilized within a predetermined temperature range at the use of this temperature chamber 5.

Three sorts of the highly nonlinear optical fiber 4 which have structures and characteristics shown in Table 1 were manufactured. In Table 1, Specimen 1 and Specimen 2 indicate highly nonlinear optical fibers which correspond to examples applied to the optical fiber wavelength converter 1 according to the present invention and Specimen 3 indicates a highly nonlinear optical fiber corresponds to a comparative example.

TABLE 1

|  |  | Specimen 1 | Specimen 2 | Specimen 3 |
|---|---|---|---|---|
| Δ1 | % | 2.8 | 2.8 | 2.8 |
| Δ2 | % | −0.55 | −1.0 | −0.3 |
| Δ3 | % | — | 0.6 | — |
| First core diameter | μm | 4.0 | 3.9 | 4.2 |
| Second core diameter | μm | 6.7 | 7.0 | 6.9 |
| Third core diameter | μm | — | 9.1 | — |
| Cladding diameter | [μm] | 90 | 90 | 90 |
| Coating diameter | [μm] | 145 | 145 | 145 |
| Dispersion slope | [ps/nm$^2$/km] | 0.017 | 0.004 | 0.026 |
| Dispersion | [ps/nm/km] | −0.05 | −0.03 | 0.10 |
| $\lambda_0$ | [nm] | 1553 | 1559 | 1554 |
| $\lambda_c$ | [nm] | 1410 | 1312 | 1456 |
| MFD | [μm] | 3.8 | 3.5 | 3.8 |
| Nonlinear coefficient γ | [W$^{-1}$km$^{-1}$] | 19.1 | 22.7 | 18.5 |
| Loss | [dB/km] | 0.84 | 1.23 | 0.87 |
| Bending Loss (20φ) | [dB/m] | <0.1 | <0.1 | <0.1 |
| PMD | [ps/nm$^{1/2}$] | 0.015 | 0.019 | 0.027 |
| λp | [nm] | 1553 | 1559 | 1554 |

Example 1 will be firstly explained.

Specimen 1, which is of highly nonlinear and has structures and characteristics shown in Table 1, was manufactured, and then was used as the highly nonlinear optical fiber 4 of the optical fiber wavelength converter 1 whose constitution is shown in FIG. 1. Experiments of the wavelength conversion were carried out with such optical fiber wavelength converter 1 constituted as described above at various environmental temperatures.

The optical fiber wavelength converter 1 had been kept at a environmental temperature of 20° C. for a sufficiently long period, and then the wavelength $\lambda p$ of the pumping light was adjusted and set within the range from $\lambda_0-1$ nanometers to $\lambda_0+1$ nanometers, where $\lambda_0$ was the zero-dispersion wavelength of Specimen 1, so that the conversion bandwidth D became its maximum at a environmental temperature of 20° C.

Figure 2:
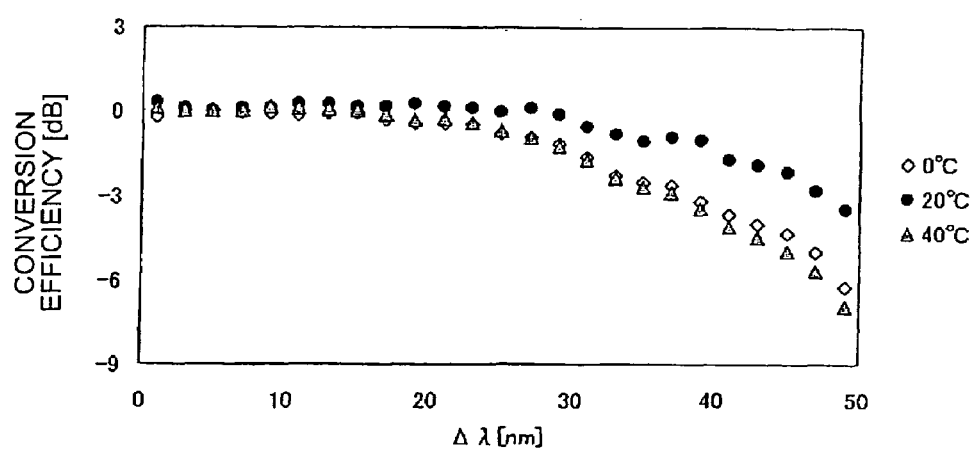
FIG. 2 is a graph of conversion efficiency versus Δλ at various environmental temperatures in Example 1 of the optical fiber wavelength converter according to the present invention.

The environmental temperature of such optical fiber wavelength converter 1 using the highly nonlinear Specimen 1 was varied from 0° C. to 40° C., and then at such temperatures, the changes in the conversion efficiency were examined at wavelengths of the signal light. The result is shown FIG. 2. In FIG. 2, the horizontal axis indicates $\Delta\lambda$ which is the absolute value of the wavelength difference between the wavelength $\lambda s$ of the signal light and the wavelength $\lambda p$ of the pumping light.

As shown in FIG. 2, the value of the defined conversion bandwidth D, i.e. $D=|\lambda p-\lambda s_2|$, is 41 nanometers at 0° C., 48 nanometers at 20° C., and 38 nanometers at 40° C. The change in the conversion bandwidth D, i.e. the value of {(the maximum value of the conversion bandwidth–the minimum value of the conversion bandwidth)/the maximum value of the conversion bandwidth}, was obtained to be (48–38)/48 was approximately 0.208, which is approximately 21 percent. As explained, the change in the conversion bandwidth D was not more than 30 percent at a temperature range from 0° C. to 40° C. in Example 1 of the optical fiber wavelength converter 1.

A conversion efficiency $E_0$ was defined to be the conversion efficiency when the wavelength $\lambda p$ of the pumping light was set to any wavelength within the range from $\lambda_0-1$ nanometers to $\lambda_0+1$ nanometers and the wavelength $\lambda s$ of the signal light was set to $\lambda p-5$ nanometers. $\lambda s_2$ in the conversion bandwidth is the wavelength of the signal light in which the conversion efficiency becomes lower than $E_0$ by 3 dB when only the wavelength $\lambda s$ of the signal light is changed at the fixed wavelength $\lambda p$ of the pumping light. Therefore, in FIG. 2, the conversion bandwidth D is obtained by reading the value of $\Delta\lambda$ at 3 dB below the conversion efficiency of the level zero for each temperature.

From the FIG. 2, it can be seen that the changes in the conversion efficiency was only not more than 1 dB at not more than 25 nanometers of the difference $\Delta\lambda$ between $\lambda p$ of the pumping light and the wavelength $\lambda s$ of the signal light, although the environmental temperature was varied within a range from 0° C. to 40° C.

The conversion efficiency E is the value of Pc/Ps in natural log, where Ps indicates the power of the signal light and Pc indicates the power of the converted light.

Example 2 will be secondly explained.

Specimen 2, which is of highly nonlinear and has structures and characteristics shown in the column of Specimen 2 of Table 1, was manufactured and set into the optical fiber wavelength converter 1 whose constitution is shown in FIG. 1, and then experiments of the wavelength conversion were carried out in similar procedures to the experiment 1 at various environmental temperatures.

Also in the experiment 2, the optical fiber wavelength converter 1 had been kept at a environmental temperature of 20° C. for a sufficiently long period, and then the wavelength $\lambda p$ of the pumping light was adjusted and set within the range from $\lambda_0-1$ nanometers to $\lambda_0+1$ nanometers, where $\lambda_0$ was the zero-dispersion wavelength of Specimen 2, so that the conversion bandwidth D became its maximum at a environmental temperature of 20° C.

Figure 3:
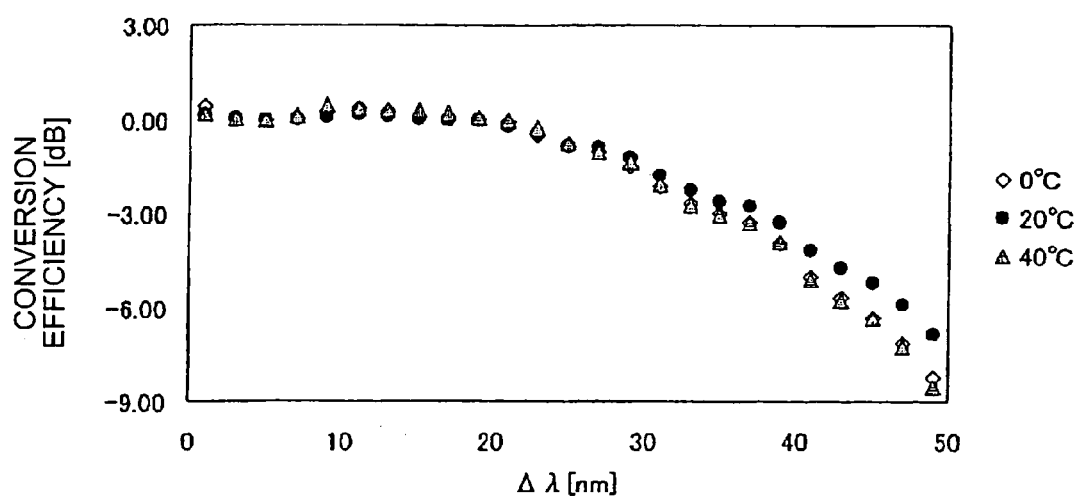
FIG. 3 is a graph of conversion efficiency versus Δλ at various environmental temperatures in Example 2 of the optical fiber wavelength converter according to the present invention.

The environmental temperature of such optical fiber wavelength converter 1 using the highly linear Specimen 2 was varied from 0° C. to 40° C., and then at such temperatures, the changes in the conversion efficiency were examined at wavelengths of the signal light. The result is shown FIG. 3. In FIG. 3, the vertical and horizontal axes are the same as those in FIG. 2.

As shown in FIG. 3, the value of the conversion bandwidth D is 35 nanometers at 0° C., 38 nanometers at 20° C., and 35 nanometers at 40° C. The change in the conversion bandwidth D, i.e. the value of {(the maximum value of the conversion bandwidth–the minimum value of the conversion bandwidth)/the maximum value of the conversion bandwidth}, was obtained to be (38–35)/38 was approximately 0.078, which is approximately 8 percent. As explained, the change in the conversion bandwidth D was not more than 30 percent at a temperature range from 0° C. to 40° C. also in Example 2 of the optical fiber wavelength converter 1.

From the FIG. 3, it can be seen that the conversion efficiency was hardly changed at not more than 25 nanometers of the difference $\Delta\lambda$ between the wavelength $\lambda p$ of the pumping light and the wavelength $\lambda s$ of the signal light, although the environmental temperature was varied within a range from 0° C. to 40° C.

The Comparative example will be thirdly explained.

Specimen 3, which is of highly nonlinear and has structures and characteristics shown in the column of Specimen 3 of Table 1, was manufactured and set into the optical fiber wavelength converter 1 whose constitution is shown in FIG. 1, and then experiments of the wavelength conversion were carried out in similar procedures to the experiments 1 and 2 at various environmental temperatures.

Also in the comparative experiment, the optical fiber wavelength converter 1 had been kept at a environmental temperature of 20° C. for a sufficiently long period, and then the wavelength $\lambda p$ of the pumping light was adjusted and set within the range from $\lambda_0-1$ nanometers to $\lambda_0+1$ nanometers, where $\lambda_0$ was the zero-dispersion wavelength of Specimen 3, so that the conversion bandwidth D became its maximum at a environmental temperature of 20° C. and a phase-matching condition is satisfied.

Figure 4:
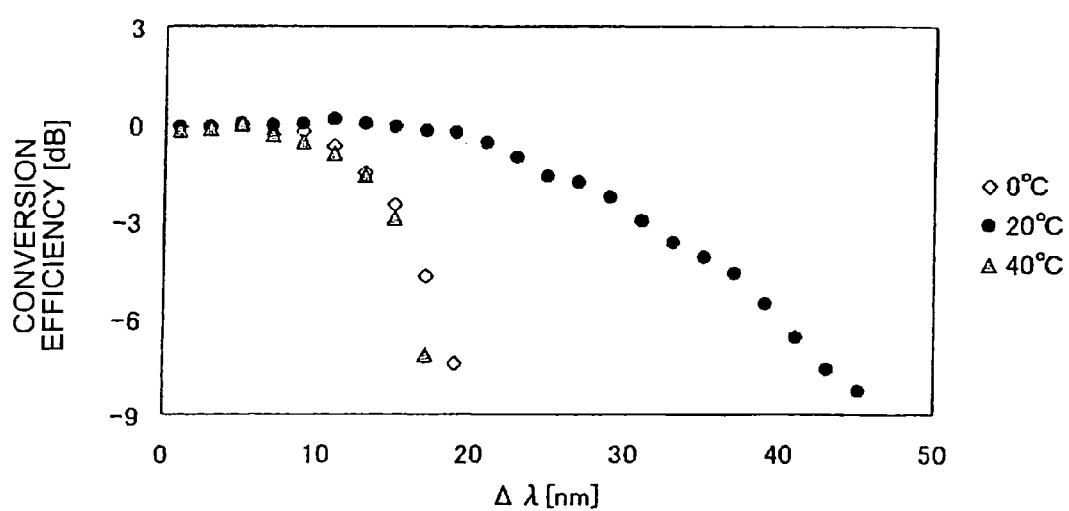
FIG. 4 is a graph of conversion efficiency versus Δλ at various temperatures in a comparative example of the optical fiber wavelength converter.

The environmental temperature of such optical fiber wavelength converter 1 using Specimen 3 was varied from 0° C. to 40° C., and then at such temperatures, the changes in the conversion efficiency were examined at wavelengths of the signal light. The result is shown. FIG. 4. In FIG. 4, the vertical and horizontal axes are the same as those in FIGS. 2 and 3.

As shown in FIG. 4, the value of the conversion bandwidth D of wavelengths is 15 nanometers at 0° C., 31 nanometers at 20° C., and 15 nanometers at 40° C. The change in the conversion bandwidth D was obtained to be (31–15)/31 was approximately 0.516, which is approximately 52 percent. As explained, the change in the conversion bandwidth D was not less than 30 percent at a temperature range from 0° C. to 40° C. in the comparative example of the optical fiber wavelength converter 1.

From the results of Example 1, Example 2, and the comparing example, it can be seen that the optical fiber wavelength converter 1 whose change in conversion bandwidth D was small against the changes in the environmental temperature, more specifically, the value was not more than 30 percent can be obtained, when the absolute value of the dispersion slope with the wavelength $\lambda$p of the pumping light emitted from the pumping light source 2 was not more than 0.02 ps/nm²/km, the highly nonlinear optical fiber 4 having not less than 10/W/km of the nonlinear coefficient $\gamma$ against the wavelength $\lambda$p of the pumping light was used for the optical fiber wavelength converter 1, and in the environmental temperature in which the optical fiber wavelength converter 1 was used, for example, in the temperature in which it was most frequently used, the wavelength $\lambda$p of the pumping light was adjusted so the conversion bandwidth D became its maximum, more specifically, the wavelength $\lambda$p of the pumping light was adjusted within the range from $\lambda_0-1$ nanometers to $\lambda_0+1$ nanometers, where $\lambda_0$ is the zero-dispersion wavelength of the highly nonlinear optical fiber 4.

In each example above, the optical fiber wavelength converter 1 having a small change in the conversion bandwidth D within a environmental temperature range from 0° C. to 40° C. was disclosed. In examples, it was adjusted so the conversion bandwidth D became its maximum at 20° C., so it is obvious from the results shown in FIGS. 2 and 3 that it can be used within a environmental temperature range from 10° C. to 30° C.

The major difference between Specimen 1 of Example 1 and Specimen 2 of Example 2 is that the absolute value of the dispersion slope of Specimen 2 is 0.004 ps/nm²/km and much smaller than a value 0.017 ps/nm²/km of that of Specimen 1.

When an optical fiber having the absolute value of the dispersion slope of not more than 0.005 ps/nm²/km is used as the highly nonlinear optical fiber 4 in the optical fiber wavelength converter 1, the change in the conversion bandwidth D of the wavelengths can be diminished against the changes in the environmental temperature.

In Specimen 2, at least a first core, a second core surrounding the first core, a third core surrounding the second core, and a cladding surrounding the third core are provided, and the relative refractive index differences of the first core, the second core, and the third core with the cladding are represented as $\Delta 1$, $\Delta 2$, and $\Delta 3$ respectively. When the relation between each relative refractive index difference is set to $\Delta 1 > \Delta 3 > 0 > \Delta 2$ and $1\% > \Delta 3 > 0.1\%$, diminishing the absolute value of the dispersion slope is facilitated in designing as explained above. Especially, diminishing the absolute value of the dispersion slope to not more than 0.005 ps/nm²/ km in a wavelength band of 1.55 micrometers is more facilitated.

What's more, when relative refractive index differences were set to $\Delta 1 > 2\%$ and $1\% > \Delta 3$, higher nonlinear coefficient $\gamma$ is obtained in Specimen 2, and then the Specimen 2 was successfully made to be a highly nonlinear optical fiber having a nonlinear coefficient $\gamma$ of not less than 10/W/km.

The relative refractive index difference $\Delta 1$ of the first core with the cladding is defined to be $\Delta 1 = \{(n_{c1}-n_c)/n_{c1}\} \times 100$, the relative refractive index difference $\Delta 2$ of the second core with the cladding is defined to be $\Delta 2 = \{(n_{c2}-n_c)/n_{c2}\} \times 100$, and the relative refractive index difference $\Delta 3$ of the first core with the cladding is defined to be $\Delta 3 = \{(n_{c3}-n_c)/n_{c3}\} \times 100$. Here, $n_{c1}$ is the maximum refractive index of the first core, $n_{c2}$ is the minimum refractive index of the second core, $n_{c3}$ is the maximum refractive index of the third core, and $n_c$ is the refractive index of the cladding.

To minimize the change in the conversion bandwidth D when the optical fiber wavelength converter 1 is placed where the temperature range is larger, more specifically, where the environmental temperature range is from −20° C. to 60° C., the highly nonlinear optical fiber 4 is to be placed in the temperature chamber 5 as shown in FIG. 1. This temperature chamber 5 is to be controlled to have the temperature that the conversion bandwidth D of the wavelengths in the described environmental temperature range becomes its maximum, for example, when 10° C. is represented as T, the temperature chamber 5 is to be controlled to have the temperature within the range from T+5° C. to T−5° C.

The device for keeping a constant temperature of the highly nonlinear optical fiber 4 is not limited to only the temperature chamber 5, but also any temperature-controlling mechanism being able to be fit into this optical fiber wavelength converter 1.

The optical fiber wavelength converter according to the embodiments enables the wavelength conversion that is stable and has a small change in the wavelength conversion bandwidth D against the changes in the environmental temperature of the environment of the converter.

In general, the wavelength conversion of the signal light in a 1.55 micrometer band whose transmission loss is small is especially desired in the quartz glass optical fibers. Therefore, the wavelength of the pumping light is preferably set within a range from 1500 nanometers to 1600 nanometers. A batch processing of the optical fiber wavelength conversion of the signal light is enabled by setting the wavelength $\lambda$p of the pumping light within a range from 1500 nanometers to 1600 nanometers in the optical fiber wavelength converter 1 according to the embodiments, for example, the wavelength conversion of signal light in C band (1530 to 1565 nanometers), the wavelength conversion from C band to L band (1565 to 1625 nanometers), from S band (1460 to 1530 nanometers) to C band, or from S band to L band is enabled.

In Table 1, $\lambda$c indicates the cut-off wavelength of each optical fiber, and is the fiber cut-off wavelength $\lambda$c defied in ITU-T (International Telecommunications Union, Telecommunication Standardization Sector) G.650. MFD indicates the Mode Field Diameter, and PMD indicates the Polarization Mode Dispersion. Definitions on characteristics and methods of measurement in this specification are in accordance with ITU-T G.650 unless specified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical fiber wavelength converter, which inputs signal light and pumping light into an end of a highly nonlinear optical fiber to obtain converted light of the signal light from the other end of the highly nonlinear optical fiber, wherein a wavelength $\lambda$p of the pumping light is set within a range from $\lambda_0-1$ nanometers to $\lambda_0+1$ nanometers, where $\lambda_0$ is a zero-dispersion wavelength of the highly nonlinear optical fiber, an absolute value of a dispersion slope of the highly nonlinear optical fiber with the wavelength λp of the pumping light is not more than 0.02 ps/nm²/km, a nonlinear coefficient γ of the highly nonlinear optical fiber with the wavelength λp of the pumping light is not less than 10/W/km, and a change in a conversion bandwidth D defined as D=|λp−λs₂| is not more than 30 percent at variable environmental temperatures ranging from 0° C. to 40° C., where E₀ is defined to be a conversion efficiency, when the wavelength λp of the pumping light is set to any wavelength within the range from λ₀−1 nanometers to λ₀+1 nanometers and a wavelength λs of the signal light is set to λp−5 nanometers, λs₂ is a wavelength of the signal light in which the conversion efficiency becomes lower than E₀ by 3 dB when only the wavelength λs of the signal light is changed at the fixed wavelength λp of the pumping light.

2. The optical fiber wavelength converter according to claim 1, wherein the highly nonlinear optical fiber has an absolute value of the dispersion slope of not more than 0.005 ps/nm²/km.

3. The optical fiber wavelength converter according to claim 1, wherein the wavelength λp of the pumping light is set within a range from 1500 nanometers to 1600 nanometers.

4. The optical fiber wavelength converter according to claim 1, wherein the highly nonlinear optical fiber has at least a first core, a second core surrounding the first core, a third core surrounding the second core, and a cladding surrounding the third core;

relative refractive index differences of the first core, the second core, and the third core with the cladding are represented as Δ1, Δ2, and Δ3 respectively;

Δ1>Δ3>0>Δ2, Δ1>2%, and 1%>Δ3>0.1%; and the absolute value of the dispersion slope with the wavelength λp of the pumping light is not more than 0.005 ps/nm²/km.

5. An optical fiber wavelength converter, which inputs signal light and pumping light into an end of a highly nonlinear optical fiber to obtain converted light of the signal light from the other end of the highly nonlinear optical fiber, wherein a wavelength λp of the pumping light is set within a range from λ₀−1 nanometers to λ₀+1 nanometers, where λ₀ is a zero-dispersion wavelength of the highly nonlinear optical fiber, an absolute value of a dispersion slope of the highly nonlinear optical fiber with the wavelength λp of the pumping light is not more than 0.02 ps/nm²/km, a nonlinear coefficient γ of the highly nonlinear optical fiber with the wavelength λp of the pumping light is not less than 10/W/km, and changes in a conversion efficiency is only not more than 1 dB at not more than 25 nanometers of a wavelength difference Δλ between the wavelength λp of the pumping light and a wavelength λs of the signal light at variable environmental temperatures ranging from 0° C. to 40° C.

6. The optical fiber wavelength converter according to claim 5, wherein the highly nonlinear optical fiber has an absolute value of the dispersion slope of not more than 0.005 ps/nm²/km.

7. The optical fiber wavelength converter according to claim 5, wherein the wavelength λp of the pumping light is set within a range from 1500 nanometers to 1600 nanometers.

8. The optical fiber wavelength converter according to claim 5, wherein the highly nonlinear optical fiber comprises at least a first core, a second core surrounding the first core, a third core surrounding the second core, and a cladding surrounding the third core, wherein relative refractive index differences of the first core, the second core, and the third core with the cladding are represented as Δ1, Δ2, and Δ3 respectively, Δ1>Δ3>0>Δ2, Δ1>2%, and 1%>Δ3>0.1%, and the absolute value of the dispersion slope with the wavelength λp of the pumping light is not more than 0.005 ps/nm²/km.

9. An optical fiber wavelength converter, which inputs signal light and pumping light into an end of a highly nonlinear optical fiber to obtain converted light of the signal light from the other end of the highly nonlinear optical fiber, wherein a wavelength λp of the pumping light set within a range from λ₀−1 nanometers to λ₀+1 nanometers so that a conversion bandwidth D defined as D=|λp−λs₂| becomes maximum within a environmental temperature range from 10° C. to 30° C., where λ₀ is a zero-dispersion wavelength of the highly nonlinear optical fiber, where E₀ is defined to be a conversion efficiency, when the wavelength λp of the pumping light is set to any wavelength within the range from λ₀−1 nanometers to λ₀+1 nanometers and a wavelength λs of the signal light is set to λp−5 nanometers, λs₂ is a wavelength of the signal light in which the conversion efficiency becomes lower than E₀ by 3 dB when only the wavelength λs of the signal light is changed at the fixed wavelength λp of the pumping light, an absolute value of a dispersion slope of the highly nonlinear optical fiber with the wavelength λp of the pumping light is not more than 0.02 ps/nm²/km, and a nonlinear coefficient γ of the highly nonlinear optical fiber with the wavelength λp of the pumping light is not less than 10/W/km.

10. The optical fiber wavelength converter according to claim 9, wherein the highly nonlinear optical fiber has an absolute value of the dispersion slope of not more than 0.005 ps/nm²/km.

11. The optical fiber wavelength converter according to claim 9, wherein the wavelength λp of the pumping light is set within a range from 1500 nanometers to 1600 nanometers.

12. The optical fiber wavelength converter according to claim 9, wherein the highly nonlinear optical fiber comprises at least a first core, a second core surrounding the first core, a third core surrounding the second core, and a cladding surrounding the third core, wherein relative refractive index differences of the first core, the second core, and the third core with the cladding are represented as Δ1, Δ2, and Δ3 respectively, Δ1>Δ3>0>Δ2, Δ1>2%, and 1%>Δ3>0.1%, and the absolute value of the dispersion slope with the wavelength λp of the pumping light is not more than 0.005 ps/nm²/km.

13. An optical fiber wavelength converter which inputs signal light and pumping light into an end of a highly nonlinear optical fiber to obtain converted light of the signal light from the other end of the highly nonlinear optical fiber, wherein a wavelength λp of the pumping light set within a range from λ₀−1 nanometers to λ₀+1 nanometers so that a conversion bandwidth D defined as D=|λp−λs₂| becomes maximum within a environmental temperature range from −20° C. to 60° C., where $\lambda_0$ is a zero-dispersion wavelength of the highly nonlinear optical fiber, where $E_0$ is defined to be a conversion efficiency, when the wavelength $\lambda p$ of the pumping light is set to any wavelength within the range from $\lambda_0-1$ nanometers to $\lambda_0+1$ nanometers and a wavelength $\lambda s$ of the signal light is set to $\lambda p-5$ nanometers, $\lambda s_2$ is a wavelength of the signal light in which the conversion efficiency becomes lower than $E_0$ by 3 dB when only the wavelength $\lambda s$ of the signal light is changed at the fixed wavelength $\lambda p$ of the pumping light, an absolute value of a dispersion slope of the highly nonlinear optical fiber with the wavelength $\lambda p$ of the pumping light is not more than 0.02 ps/nm²/km, a nonlinear coefficient $\gamma$ of the highly nonlinear optical fiber with the wavelength $\lambda p$ of the pumping light is not less than 10/W/km, and the optical fiber wavelength converter comprising a temperature-controlling mechanism which keeps a temperature of the highly nonlinear optical fiber within a range from T+5° C. to T−5° C., where T is a temperature in which the conversion bandwidth D becomes its maximum.

14. The optical fiber wavelength converter according to claim 13, wherein the highly nonlinear optical fiber has an absolute value of the dispersion slope of not more than 0.005 ps/nm²/km.

15. The optical fiber wavelength converter according to claim 13, wherein the wavelength $\lambda p$ of the pumping light is set within a range from 1500 nanometers to 1600 nanometers.

16. The optical fiber wavelength converter according to claim 13, wherein the highly nonlinear optical fiber comprises at least a first core, a second core surrounding the first core, a third core surrounding the second core, and a cladding surrounding the third core, wherein relative refractive index differences of the first core, the second core, and the third core with the cladding are represented as $\Delta 1$, $\Delta 2$, and $\Delta 3$ respectively, $\Delta 1 > \Delta 3 > 0 > \Delta 2$, $\Delta 1 > 2\%$, and $1\% > \Delta 3 > 0.1\%$, and the absolute value of the dispersion slope with the wavelength $\lambda p$ of the pumping light is not more than 0.005 ps/nm²/km.

* * * * *